Jan. 2, 1968     D. J. BAUMGARTEN     3,361,017
TAPERING TOOL
Filed March 29, 1966
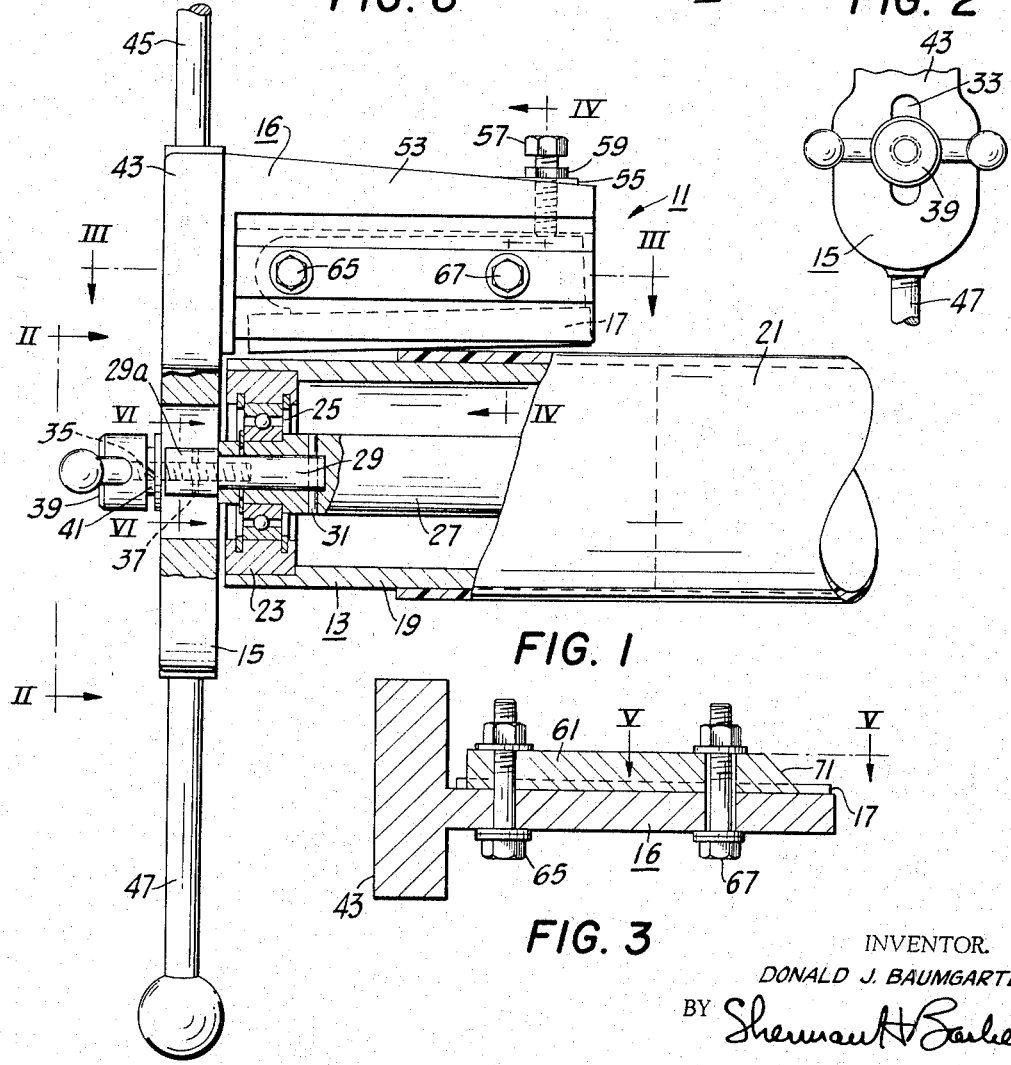
INVENTOR.
DONALD J. BAUMGARTEN
BY Sherman H Barber
his Attorney United States Patent Office 3,361,017
Patented Jan. 2, 1968

3,361,017
TAPERING TOOL
Donald J. Baumgarten, New York, N.Y., assignor to Koppers Company, Inc., a corporation of Delaware
Filed Mar. 29, 1966, Ser. No. 538,374
6 Claims. (Cl. 82—4)

This invention relates to an improved apparatus for reducing the wall thickness of a hollow article and, in particular, apparatus for tapering the wall thickness of fiberglass pipe.

In accordance with the invention, there is provided a tool for reducing the end wall thickness of a tubular article such as fiberglass pipe that includes: a mandrel internally contacting the walls of the tubular article; and a head portion journally mounted in the mandrel and rotatable relative to the mandrel. The head portion is fitted with an arm that projects from the head in a substantially parallel relation to the axis of the mandrel. On the arm there is a first pivot bolt adjacent the head portion and a second bolt spaced therefrom. A cutter blade clamp bar is mounted pivotally to the first bold and adjustably to the second bolt. When suitable indicia on the clamp bar and the arm are matched, then the clamp bar and a cutter blade mounted between the clamp bar and the arm will be suitably inclined relative to the axis of the arm and to the parallel axis of the mandrel and pipe. A keeper bolt is provided to lock the blade clamp and blade at the preselected angle. Thereafter, when the mandrel is inserted into a length of fiberglass pipe, and the head portion is both rotated about the axis of the mandrel and thrust in the direction toward the pipe, the cutter blade will commence tapering the end portion of the fiberglass pipe to a preselected taper angle.

For a further understanding of the invention and for advantages and features thereof, reference may be made to the following description taken in conjunction with the accompanying drawing which shows for the purpose of exemplification a preferred embodiment of the invention.

In the drawing:

FIG. 1 is an elevational view, partly in section, of a preferred embodiment of the invention in one operative position;

FIG. 2 is a sectional view along line II—II of FIG. 1;
FIG. 3 is a sectional view along line III—III of FIG. 1;
FIG. 4 is a view along line IV—IV of FIG. 1;
FIG. 5 is a view along line V—V of FIG. 3; and
FIG. 6 is a view along line VI—VI of FIG. 1.

FIG. 1 illustrates a pipe tapering or scarfing tool 11 in accordance with a preferred embodiment of the invention that includes a mandrel 13, a main body portion 15, a cutter bar supporting arm 16, and a cutter bar 17.

The mandrel 13 is preferably a hollow cylindrical shell 19 that is adapted to neatly fit within the end portion of a length of fiberglass tubing or pipe 21. The hollow mandrel or shell 19 is provided with end walls 23 that support bearings 25 wherein is journaled a pilot shaft 27. One end of the shaft 27 extends outwardly from the bearings 25 and the end wall 23 (FIG. 1).

In a particular application, the mandrel 13 will be of such a size as to fit neatly within the end of a particular size of fiberglass pipe or tube. It will be appreciated by those skilled in the art that for different sizes of pipes, it will be necessary to provide mandrels of different size so that each will fit neatly within a respective size of pipe. However, in some applications it may be advantageous to use a conventional type of expandable mandrel. The mandrel of course should neatly fit within the end of the pipe and not rotate relative to the pipe. The mandrel provides support for the wall of the pipe in the vicinity of the cutting action to be described hereinafter.

The end portion of the shaft 27 is suitably bored to receive a stub shaft 29 which may be secured within the shaft 27 by means of a keeper pin 31 or in any other suitable manner. The outer end of the stub shaft 29 is preferably ovalar in shape, as at 29a, so as to fit in and coact with an ovalar elongated slot 33 in the head portion 15 (FIG. 1). In like manner, the outward ovalar end 29a of the stub shaft 29 is threaded to receive a stud 35 which may also be secured in place by means of another keeper pin 37 or in any other suitable manner. The head portion 15 may be fixably mounted to the shaft 27 by means of a conventional winged head nut 39 with a lock washer 41 disposed between the winged head nut 39 and the head portion 15.

The upper portion of the ovalar head portion 15 is integrally formed with a rectangular base 43 that supports the cutter bar supporting arm 16 so that the arm 16 projects outwardly therefrom in a generally parallel relation to the axis of the shaft 27 and the mandrel 13. A pair of similar operative lever rods 45, 47 are threadedly mounted in opposite ends of the head portion 15, in generally axial alignment, for a purpose to be hereinafter described.

The cutter bar supporting arm 16 has a generally T-shaped cross section (FIG. 4), and the depending stem portion thereof 49 has a slot or groove 51 in it that extends generally for the entire length of the arm (FIG. 1). The head portion 53 of the arm 16 is slightly thicker adjacent the base portion 43 than at the outer end and, at the outer end of the arm 16, there is a bossing 55. A keeper bolt 57, with lock nut 59, is threaded through the bossing 55 and arm 16 so that it extends into the groove 51 (FIG. 4). In the groove 51 there is a cutter bar clamping bar 61 which also has a longitudinal groove therein 63 in which the cutter bar 17 itself is mounted. Preferably, the cutter bar clamping bar 61 is pivotally mounted to the supporting arm 16 by means of a first pivot bolt, nut and lock washer arrangement 65, located adjacent the base portion 43. A similar bolt, nut and lock washer arrangement 67 is located adjacent the outer end of the cutter bar supporting arm 16, and the bolt arrangement 67 cooperates with an elongated slot 69 (FIG. 5) in the clamping bar 61.

The clamping bar 61 is pivotable about the axis of the bolt 65 through an angle as determined by the general dimentions of the groove 51. Preferably, the outer end of the clamping bar 61 is chamfered, as at 71 (FIG. 3), and an indicia 73 (FIG. 5) is marked thereon in any suitable manner. The indicia 73 is adjacent other numbered indicia 75 suitably marked also on the groove wall in the stem portion 49. The numbered indicia 75 are spaced apart angularly from the center of the pivot bolt 65, and so, when the indicia 73 is opposite one of the numbered indicia 75, the clamping bar will then be inclined with respect to the axis of the arm and the axis of the mandrel and pipe at an angle designated by the respective matching indicia. Of course, when the cutter bar 17 is secured in the groove 63 so that one of the cutting edges of the double-edged cutter bar 17 is in contact with the top wall of the groove 63, then the other cutting edge of the cutter bar 17 will be also inclined to the surface of the conduit 21 at the respective angle suggested by the matched indicia. Then the bolts and nuts 65, 67 may be tightened and the keeper bolt 57 threaded down so that its projecting end contacts the clamping bar (FIG. 4). Thereafter, the lock nut 59 is tightened and the tapering tool is ready for tapering the end of the pipe or conduit 21 in the following manner.

The mandrel 13 is first inserted part way into the end of the pipe 21 until the cutter bar 17 engages the outward extremity of the pipe 21. The relation of the tool to the pipe 21 will be about as shown in FIG. 1. It is assumed, of course, that the other end of the pipe 21 is suitably supported or fixed in a vise or other structure so that it will not rotate when the tool is hereinafter rotated. Prior to insertion of the mandrel, of course, the winged head nut 39 is loosened on the stud 35 and the head portion 15 is so positioned that the cutter bar would contact the end portion of the pipe 21 about where shown in FIG. 1. The winged head nut 39 may then be tightened to secure the head portion 15 to the shaft 27.

The tool 11 may then be rotated in a clockwise direction (FIG. 4) by grasping the ends of the lever rods 45, 47 and turning them in a clockwise direction. At the same time, the tool may be thrust in the direction toward the end of the pipe 21 so that the cutter bar will reduce the wall thickness at the end of the pipe 21 as the tool is moved directionally toward the end of the pipe 21.

While exerting the tool lineally toward the pipe end, the cutter blade will remove fiberglass material from the pipe wall and taper the same to the preselected angle to which the cutter blade was set and which is indicated by matching indicia 73, 75.

During rotation of the head portion 15, it should be noted that the mandrel itself does not rotate because the shaft 27 to which the head is secured rotates freely in the bearings 25. The mandrel 13 fits neatly within the pipe 21 and supports the wall against the pressure exerted by the cutter blade 17. In some applications, however, both the mandrel may be fixed to the stub shaft 29 and then both the mandrel 13 and the head portion 15 will rotate simultaneously. The mandrel should fit nearly into the pipe and support the inner wall surface so that it will not crack or break during the tapering operation. A tight fit is not desired as this may cause a binding of the mandrel in the pipe, and yet a too loose fitting is also undesirable because then there is insufficient support for the wall of the pipe during the cutting and shaping process.

When it is desired to shape the end portion of other sizes of pipe, the apparatus of the invention may be readily adjusted to suit the pipe size by first selecting a mandrel of proper size that will neatly fit within the pipe; then adjusting the head, arm and blade as described hereinbefore, and lastly locking the head to the shaft by turning the winged head nut 39.

It is a feature of the present invention that the cutter blade 17 and blade clamp 61 may be easily and readily adjusted to different desired cutting angles by merely pivoting the cutter blade clamp bar 61 at the desired angle shown by matching indicia 73, 75. It is not necessary to remove the cutter bar clamp device and replace it to change the desired angle of taper on the pipe.

A feature of the present invention is that the clamp bar 61 remains in one position and has only one groove for contacting and clamping the cutter blade 17. This feature makes it possible to quickly change taper angles by loosening and tightening only two bolts and a keeper bolt.

It is a featuer of the present invention that the cutting angle of the cutter bar 17 may be easily and quickly adjusted by simply matching indicia and thereafter quickly and easily locking the cutter bar in place. It is not necessary to disassemble any portion of the tapering tool to accomplish a change in the slope of the taper on the fiberglass pipe.

Although the invention has been described herein with a certain degree of particularity, it is understood that the present disclosure has been made only as an example and that various modifications and changes may be made within the scope of the invention as defined by the appended claims.

What is claimed is:

1. Apparatus for reducing the wall thickness of a tubular article adjacent an end thereof comprising:
   (a) a mandrel adapted to fit within the end of the tubular article and in support of the wall thereof;
   (b) a head portion adjustably mounted to said mandrel and having an arm fixedly mounted thereto extending outwardly generally in a direction parallel to the axis of said mandrel;
   (c) an elongate perforated clamping member pivotally mounted to said arm and having therein an elongate longitudinally extending channel;
   (d) a cutter blade having a cutting edge and adapted to conform to the channel in said clamping member;
   (e) means for securing said cutter blade in said channel and both said cutter blade and said clamping member to said arm at a preselected angle with respect to the axis of said mandrel whereby when said mandrel is inserted in said tubular article and when said head portion is rotated about the axis of said mandrel, said cutter blade engages and reduces the wall thickness of said tubular article conformable with the angular setting of said cutter blade and clamping member.

2. The invention set forth in claim 1 including:
   (a) indicia on said arm angularly spaced apart with respect to the axis of the pivotal mounting of said clamping member;
   (b) indicia on said clamping member whereby when the indicia on said clamping member is matched with an indicia on said arm and when said cutter bar is clamped between said arm and said clamping member, said cutter bar is then biased toward the axis of said mandrel at said preselected angle.

3. The invention set forth in claim 2 wherein:
   (a) the means for keeping and maintaining said cutter bar and clamping bar at said preselected angle when said apparatus is used to reduce the wall thickness of a tubular article comprises two spaced apart fasteners, the fastener nearest said head portion being a pivot and said other fastener operating in an elongate slot in said clamping bar.

4. Apparatus for reducing the wall thickness of a tubular article adjacent an end thereof comprising:
   (a) a mandrel adapted to fit within the end of the tubular article and in support of the wall thereof;
   (b) a shaft journally mounted in said mandrel and extending therefrom;
   (c) a head portion having an elongate slot engageable with said shaft extension whereby both said head portion and said shaft are rotatable simultaneously;
   (d) means for securing said head portion to said shaft;
   (e) an arm fixed to said head portion and extending therefrom generally in a direction parallel to the axis of said mandrel;
   (f) a pivot on said arm at a location adjacent the connection of said arm to said head portion;
   (g) an elongate perforated clamping member mounted to said pivot for position in various selectable biased relations to said axis and having therein an elongate longitudinally extending channel;
   (h) indicia on said clamping member;
   (i) indicia on said arm adjacent the indicia on said clamping member;
   (j) a cutter bar having a plurality of cutting edges adapted to be positioned between said clamping member and said arm and in conformity with said channel whereby when said clamping member is pivotally biased in relation to said axis as indicated by matching said indicia said cutter bar is also correspondingly biased with relation to said axis; and
   (k) means for securing both the cutter bar and the clamping member to said arm in selectable angular positions.

5. The invention set forth in claim 4 including:
   (a) a means for rotating said head portion relative to said mandrel.

6. The invention set forth in claim 4 wherein:
   (a) said head portion is positionable on said shaft extension so that when said cutter blade and said clamping member are fixed at a preselected angle with respect to the axis of said mandrel as indicated by matching said indicia and when said mandrel is inserted in said tubular article, said cutter blade engages and reduces the wall thickness of said tubular article as said head portion is rotated about said axis.

References Cited

UNITED STATES PATENTS 3,167,982  2/1965  Sherwood _____ 82—4

LEONIDAS VLACHOS, *Primary Examiner.*